United States Patent
Lee et al.

(10) Patent No.: US 9,030,479 B2
(45) Date of Patent: May 12, 2015

(54) SYSTEM AND METHOD FOR MOTION EDITING MULTIPLE SYNCHRONIZED CHARACTERS

(75) Inventors: Jehee Lee, Seoul (KR); Manmyung Kim, Seoul (KR)

(73) Assignee: SNU R&DB Foundation, Seoul (KR)

( * ) Notice: Subject to any disclaimer, the term of this patent is extended or adjusted under 35 U.S.C. 154(b) by 686 days.

(21) Appl. No.: 13/376,781

(22) PCT Filed: Jun. 19, 2009

(86) PCT No.: PCT/KR2009/003307
§ 371 (c)(1),
(2), (4) Date: Dec. 7, 2011

(87) PCT Pub. No.: WO2010/143766
PCT Pub. Date: Dec. 16, 2010

(65) Prior Publication Data
US 2012/0075349 A1 Mar. 29, 2012

(30) Foreign Application Priority Data
Jun. 11, 2009 (KR) ........................ 10-2009-0052017

(51) Int. Cl.
*G06T 13/00* (2011.01)
*G06T 13/40* (2011.01)
*G06N 3/00* (2006.01)

(52) U.S. Cl.
CPC ................ *G06T 13/40* (2013.01); *G06N 3/006* (2013.01); *G06T 2213/08* (2013.01)

(58) Field of Classification Search
CPC ..... G06T 13/40; G06T 2213/08; G06N 3/006
USPC ............................ 345/473–475; 34/473–475
See application file for complete search history.

(56) References Cited

FOREIGN PATENT DOCUMENTS

KR 0682849 2/2007

OTHER PUBLICATIONS

Kwon, Taesoo, et al. "Group motion editing." ACM Transactions on Graphics (TOG). vol. 27. No. 3. ACM, 2008.*
Lee, Jehee, and Sung Yong Shin. "A hierarchical approach to interactive motion editing for human-like figures." Proceedings of the 26th annual conference on Computer graphics and interactive techniques. ACM Press/Addison-Wesley Publishing Co., 1999.*
Lee, Jehee, et al. "Interactive control of avatars animated with human motion data." ACM Transactions on Graphics (TOG). vol. 21. No. 3. ACM, 2002.*
Hsu, Eugene, Marco da Silva, and Jovan Popović. "Guided time warping for motion editing." Proceedings of the 2007 ACM SIGGRAPH/Eurographics symposium on Computer animation. Eurographics Association, 2007.*
International Search Report for PCT/KR2009/003307 dated Jun. 23, 2010.

\* cited by examiner

*Primary Examiner* — Jason M Repko
*Assistant Examiner* — Scott E Sonners
(74) *Attorney, Agent, or Firm* — Rajesh Vallabh; Foley Hoag LLP

(57) ABSTRACT

Disclosed are a system and a method for motion editing multiple synchronized characters. The motion editing system comprises: a Laplacian motion editor which edits a spatial route of inputted character data according to user conditions, and processes the distortion of the interaction time; and a discrete motion editor which applies a discrete transformation while the character data is processed.

16 Claims, 8 Drawing Sheets

FIG. 4
401
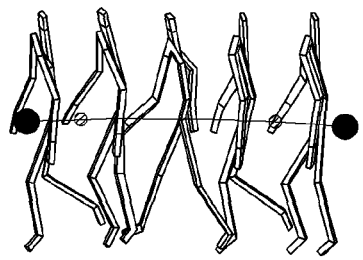
402
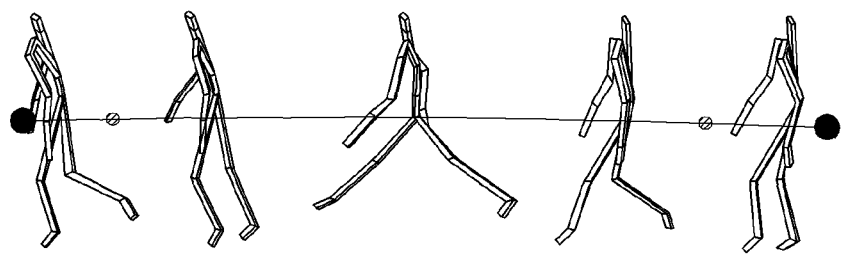
403
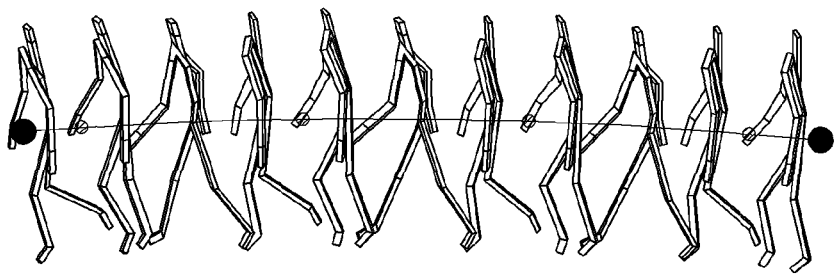

FIG. 6

---
Algorithm 1: Discrete Path Editing
---
$\mathbb{P}$ : A set of motion paths;
$\mathbb{P}'$ : A set of deformed, time-warped paths;
$C$ : A set of spatial and temporal constraints;

1  while *motions are manipulated* do
2     if *C is updated* then
3        $\mathbb{P}_{new} \leftarrow \mathbb{P}$;
4        $\mathbb{P}'_{new} \leftarrow$ LaplacianEditing($\mathbb{P}, C$);
5        $E_{new} \leftarrow$ DeformationEnergy($\mathbb{P}_{new}, \mathbb{P}'_{new}, C$);

6        foreach $\mathbb{P}_c \in$ DiscreteTransform($\mathbb{P}$) do
7           $\mathbb{P}'_c \leftarrow$ LaplacianEditing($\mathbb{P}_c, C$);
8           $E_c \leftarrow$ DeformationEnergy($\mathbb{P}_c, \mathbb{P}'_c, C$);
9           if $E_c < E_{new}$ then
10             $\mathbb{P}_{new} \leftarrow \mathbb{P}_c$;
11             $\mathbb{P}'_{new} \leftarrow \mathbb{P}'_c$;
12             $E_{new} \leftarrow E_c$;

13    $\mathbb{P} \leftarrow \mathbb{P}_{new}$;
14    $\mathbb{P}' \leftarrow \mathbb{P}'_{new}$;

SYSTEM AND METHOD FOR MOTION EDITING MULTIPLE SYNCHRONIZED CHARACTERS

TECHNICAL FIELD

The present invention relates to a system and method for editing synchronized multi-character motions.

BACKGROUND ART

Collaborative and adversarial interactions among multiple characters usually require synchronization in both space and time. Most existing motion editing techniques allow motions of each individual character to be manipulated independently. Editing synchronized multi-character motions can be cumbersome if the animator has to maintain interpersonal constraints manually, for synchronization. Herein, a motion editing system and method capable of efficiently editing multi-character motions will be provided.

DISCLOSURE OF INVENTION

Technical Goals

An aspect of the present invention provides a motion editing system and method that may deal with spatial path editing, time warping, and interpersonal interactions with respect to multiple characters in a unified framework.

Another aspect of the present invention provides a motion editing system and method that may edit synchronized motions on a large scale by incorporating discrete editing capabilities into interactive manipulation interfaces, and thereby discrete editing and continuous path editing may be combined seamlessly.

Technical Solutions

According to an aspect of the present invention, there is provided a motion editing system, including a Laplacian motion editor to edit a spatial path of character data input according to user constraints, and to process interactive time warping, and a discrete motion editor to apply discrete transformations while the character data is processed.

The Laplacian motion editor may include a spatial path editor to edit the spatial path through shape-preserving manipulation and scale compensation, and a time warping processor to process the interactive time warping.

The Laplacian motion editor may further include a degenerate case processor to process degenerate cases, and a full-body motion refining unit to refine a full-body motion of a character.

The discrete motion editor may include a discrete transformation applying unit to apply a discrete transformation to a motion path of the character data, a deformation energy calculating unit to calculate an amount of deformation energy of the motion path, which the discrete transformation is applied to, satisfying the user constraints, a discrete transformation pruning unit to prune unsuitable discrete transformations, and an accelerating unit to subsample motion paths for evaluating the discrete transformation.

Types of discrete transformation may correspond to insertion, deletion, and replacement. The user constraints may include spatial constraints including pinning constraints, relative constraints and end-effector constraints, and temporal constraints including an absolute time, duration, and synchronization.

According to another aspect of the present invention, there is provided a method of editing motions in a motion editing system including a Laplacian motion editor and a discrete motion editor, the method including editing a spatial path of character data input according to user constraints, and processing interactive time warping, by the Laplacian motion editor, and applying, by the discrete motion editor, discrete transformations while the character data is processed.

Advantageous Effects

According to embodiments of the present invention, it is possible to deal with spatial path editing, time warping, and interpersonal interactions with respect to multiple characters in a unified framework.

According to embodiments of the present invention, it is possible to edit synchronized motions in large scales by incorporating discrete editing capabilities into interactive manipulation interfaces, whereby discrete editing and continuous path editing may be combined seamlessly.

BRIEF DESCRIPTION OF DRAWINGS

FIG. 4 illustrates walking motions of a character according to an embodiment of the present invention.

FIG. 6 illustrates an algorithm to be used for optimizing a discrete transformation in a motion editing system according to an embodiment of the present invention.

BEST MODE FOR CARRYING OUT THE INVENTION

Figure 1:
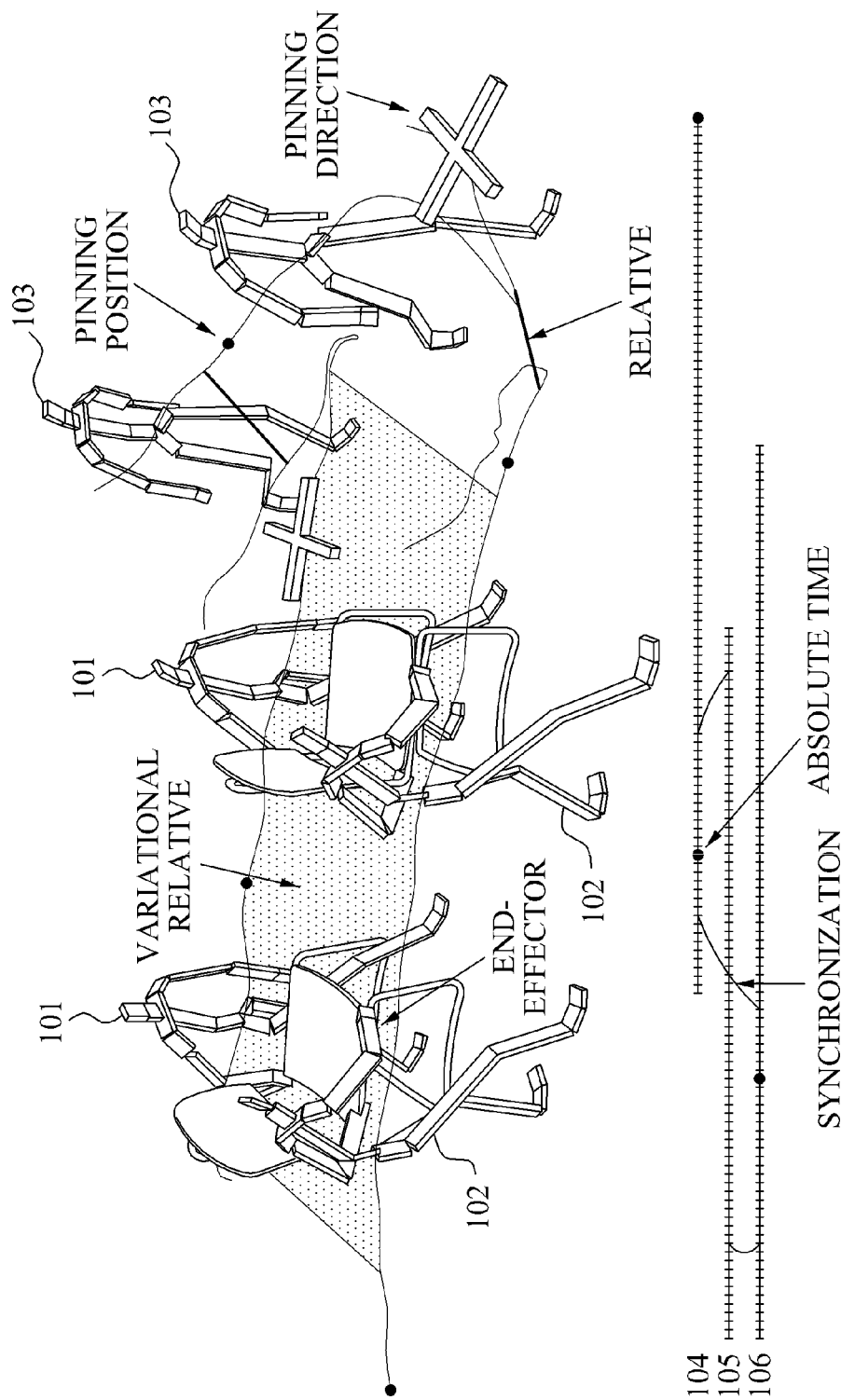
FIG. 1 illustrates multiple characters and an object according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

The ability to interactively edit human motion data in a conversational manner is essential for character animation. According to an embodiment of the present invention, Laplacian motion editing that is used in a motion editing system may formulate interactions among multiple characters as a collection of linear constraints, and may enforce the linear constraints while a user manipulates motions of the characters in both spatial and temporal domains, directly. Various types of manipulation handles may be provided to specify absolute and relative spatial locations, a spatial direction, a timing of interactions, a temporal duration, and synchronization of multiple characters. The capability of non-sequential discrete editing may be incorporated into motion editing interfaces according to an embodiment of the present invention and thus, continuous and discrete editing may be performed simultaneously and seamlessly. Herein, it will be demonstrated that the synchronized multi-character motions may be synthesized and manipulated at interactive rates using spatiotemporal constraints.

The ability to interactively edit human motion data is a vital tool for character animation. The common goal of motion editing is to make a desired change to existing motion data while preserving the essential quality and features of the original motion, as much as possible. Interactive editing techniques typically allow the user to manipulate motion data by specifying pinning constraints and dragging its moving trajectory directly.

Collaborative and adversarial interactions among multiple characters usually require synchronization in both space and time. Most existing motion editing techniques allow the motion of each individual character to be manipulated independently. Editing synchronized multi-character motions may be cumbersome if the animator has to maintain interpersonal constraints manually, for synchronization. Herein, a novel interactive motion editing technique that may allow the animator to specify the interaction among characters as a collection of linear constraints and manipulate synchronized multiple character motions simultaneously, while maintaining the constraints.

Various types of manipulation handles and interpersonal constraints may be provided to specify absolute and relative spatial locations, the spatial direction, the temporal duration, and the timing of interactions. The user may stretch and squeeze synchronized motion data in both spatial and temporal domains through intuitive, easy-to-use user interfaces.

According to an embodiment of the present invention, a motion editing system may be based on a one-dimensional version of Laplacian mesh editing. This method may allow a polygonal curve to be deformed while preserving the original shape, as much as possible. Herein, generalization of an idea for dealing with synchronized motion paths, how to incorporate spatiotemporal constraints into the Laplacian formulation, and how to cope with degenerate cases will be discussed. The path editing algorithm may be employed for both spatial path editing and interactive time warping. Therefore, the spatial and temporal aspects of motion data may be handled uniformly.

The Laplacian motion editing may make smooth, continuous changes to the original motion by warping moving trajectory of the character. The underlying structure of the motion may remain intact for mild stretching, squashing, and bending. However, discrete and structural transformations of motion, for example, adding or removing walking steps, may be made to accommodate large edits in the motion path. Such discrete motion editing may be implemented by segmenting motion data into short clips and splicing the segmented motion data in a novel order. The motion editing system may incorporate non-sequential discrete editing capabilities seamlessly into motion editing interfaces, whereby discrete changes may ensue as fluidly as continuous path editing during interactive manipulation. Discrete optimization of a motion path is notorious for including complex exponential computations with respect to the number of potential discrete transformations. As such, general discrete optimization using a collection of rich connected motions may be impractical for interactive applications. Conversely, interactive editing may be inherently incremental and thus, a sudden jump in manipulation may be avoided. The gradual transformation process may enable interactive performance to be achieved by taking an efficient and incremental strategy. The continuous and discrete editing capabilities of the motion editing system may be demonstrated with examples that require precise spatiotemporal control of multiple characters interacting with other characters and objects in an environment.

I. Multiple Character Interaction

Animated characters may interact with environments and other characters synchronized both in time and space. Such character-environment and character-character relations may be described in terms of relative spatial locations, spatial directions, and the timing of interactions.

According to an embodiment of the present invention, multiple character interactions that may be specified as linear constraints may be considered, and the motion editing problem may be formulated as an over-determined system of linear equations with linear equality constraints.

The motion of an articulated character may be represented by time-varying positions and orientations of the root body segment in the reference coordinate system along with joint angles also varying over time. The root trajectory projected onto the ground may form a motion path. The motion editing system may enable specifying constraints either on a motion path or on any end-effectors to edit a full-body motion. The present invention may focus on editing multiple motion paths synchronized by interpersonal constraints. When each path is modified, the full-body motion that is immediately refined to enforce end-effector constraints and remove foot sliding artifacts will be described in detail.

First, Table 1 shows mathematical notations that are used herein.

TABLE 1

| Symbol | Meaning |
| --- | --- |
| Subscript i, j | Frame indexes |
| Superscript k, $\alpha$, $\beta$ | Path indexes |
| Subscript s | spatial |
| Subscript t | temporal |
| $p_i \in R^2$ | Position of the root at frame i |
| $\theta_i \in R$ | Orientation of the root at frame i |
| $t_i \in R^2$ | Tangent vector at frame i |
| $n_i \in R^2$ | Normal vector at frame i |
| $t_i \in R$ | Time-warp at frame i |
| $P^k$ | k-th motion path |
| $P = \{P^k\}$ | A set of motion paths |
| C | A set of constraints |

1-1. Spatial Constraints

A motion path that describes a time series of body (pelvis) locations and directions on the horizontal plane may be expressed by $\{(p_i, \theta_i) \in R^2 \times R\}$. For ease of implementation, a position $p_i$ in a global reference coordinate system and a direction $\theta_i$ with respect to a local coordinate system defined by tangent and normal vectors of the motion path may be used. Here, the tangent vector at the position $p_i$ may be expressed by finite difference, $t_i = p_{i+1} - p_{i-1}$, and the normal vector may be expressed by $n_i = Rt_i$, where R corresponds to a 2×2 rotation matrix of angle 90°. Since the direction $\theta_1$ may be bound to the local coordinate system, the direction of a character may be determined automatically with respect to the deformation of a translational moving path. Henceforth, only the position components in motion paths may be manipulated, and the direction components may be adjusted in accordance with the manipulation of the position components.

The tangent vector at a single point may degenerate for a stationary motion such that $\|t_1\| < \epsilon$, for an infinitesimal value of $\epsilon$. To deal with this situation, all degenerate points may be identified first by checking the lengths of tangent vectors. In this instance, new tangent vectors may be determined at those points by linearly interpolating nearby non-degenerate tangent vectors.

The motion editing system may provide three types of spatial constraints for interactive manipulation. Here, pinning constraints and relative constraints may be imposed on motion paths, while end-effector constraints may be imposed on a predetermined part of the character body.

The pinning constraints may indicate that the position and direction of a character at a frame i may be constrained with respect to a global reference coordinate system. Given a position constraint $(c_x, c_y) \in R^2$, the constraint equation may be trivially linear with respect to a series of $p_i$s, which may be expressed by Equation 1. Similarly, the tangent direction of a motion path may be linearly constrained, as expressed by Equation 2, for any direction expressed by $(d_x, d_y) \in R^2$.

$$p_i = (c_x, c_y) \quad \text{[Equation 1]}$$

$$p_{i+1} - p_{i-1} = (d_x, d_y) \quad \text{[Equation 2]}$$

The relative constraints may indicate that the position and direction of a character α at frame i may also be constrained with respect to a body of local coordinate system of another character β at frame j. Given a relative position $(c_x, c_y) \in R^2$ and a relative direction $(d_x, d_y) \in R^2$, constraint equations may be expressed by Equation 3 and Equation 4, respectively.

$$p_i^\alpha = p_j^\beta + c_x(p_{j+1}^\beta - p_{j-1}^\beta) + c_y R(p_{j+1}^\beta - p_{j-1}^\beta) \quad \text{[Equation 3]}$$

$$p_{i+1}^\alpha - p_{i-1}^\alpha = d_x(p_{j+1}^\beta - p_{j-1}^\beta) + d_y R(p_{j+1}^\beta - p_{j-1}^\beta) \quad \text{[Equation 4]}$$

The end-effector constraints may include types of constraints that may be handled by a standard inverse kinematics solver. Typically, the position and orientation of body part of a character at a predetermined frame may be constrained with respect to either a reference coordinate system or a local coordinate system of another character or object.

All types of constraints may be imposed either on a single time instance which is called instant constraints, or on a time interval which is called variational constraints.

FIG. 1 illustrates multiple characters and an object according to an embodiment of the present invention. In FIG. 1, a first character 101 and a second character 102 walking towards a chair, picking the chair up on opposite sides, and carrying the chair together are illustrated. In order to edit the collaborative and synchronized motion, relative constraints for the characters to stay at the correct locations relative to the chair and end-effector constraints for hands of the characters to remain on the chair while carrying the chair may be specified. Relative constraints for a third character 103 to prevent collisions with the first character 101 and the second character 102 may be specified. A first time track 104 may indicate temporal constraints for the third character 103, a second time track 105 may indicate temporal constraints for the first character 101, and a third time track 106 may indicate temporal constraints for the second character 102.

In the foregoing example, both relative constraints and end-effector constraints may need to be variational.

The motion editing system may allow the user to decide how precisely each constraint may be satisfied. Soft constraints may be maintained in a least squares sense while hard constraints are enforced precisely. A variational constraint may be approximated by a series of soft constraints. The series of coordinate values of multiple paths may be concatenated to form a long vector as expressed by Equation 5.

$$p = (p_0^\alpha p_1^\alpha \ldots p_0^\beta p_1^\beta \ldots )^T \quad \text{[Equation 5]}$$

A collection of path constraints may pose a linear system of equations in terms of a vector p. Soft spatial constraints and hard spatial constraints may be expressed by $B_s p = b_s$ and $H_s p = h_s$, respectively.

1-2. Temporal Constraints

The motion clip may refer to a sequence of motion frames usually sampled at a fixed frame rate. A collection of motion clips may be aligned along multiple time tracks, and may be strung together to synthesize multiple character interaction. Each time track may manage the timing of a single character motion. The timing in each motion clip may be locally parameterized by frame index i that maps to $t_i \in R$ in synchronized reference time. Three types of temporal constraints may be provided to time-warping motions in a single time track, and may synchronize multiple character motions across time tracks.

An absolute time may indicate that the timing of a character motion at a frame i may be constrained with respect to a reference time. Given an absolute time $c_t \in R$, the constraint equation may be expressed by Equation 6.

$$t_i = c_t \quad \text{[Equation 6]}$$

Here, duration may indicate that a duration of a motion sequence between a frame i and a frame j may be specified by a constraint, which is formulated as expressed by Equation 7.

$$t_j - t_i = d_t, \quad \text{[Equation 7]}$$

where a duration $d_t \in R$ may have a scalar value.

Synchronization may indicate that the timing of two characters may be synchronized. The constraint equation may be expressed by Equation 8.

$$t_i = t_k + e_t, \quad \text{[Equation 8]}$$

where $t_i$ denotes the timing of a character at a frame i, $t_k$ denotes the timing of another character at a frame k, and a time discrepancy $e_t$ denotes a constant scalar value. If $e_t = 0$, two character motions may need to be synchronized exactly at the frame i and the frame k in the reference time.

Temporal constraints may also be specified as either soft constraints or hard constraints. The soft temporal constraints may be expressed by $B_t t = b_t$, and the hard temporal constraints may be expressed by $H_t t = h_t$, respectively.

II. Laplacian Motion Editing 2-1. Spatial Path Editing

Given a collection of synchronized motion paths, the paths may be modified to meet user-specified constraints by solving two least squares problems sequentially. The solution of the first problem may generate an intermediate result that satisfies user constraints while preserving the detailed features of the original paths, as much as possible. The result may be obtained by solving a second least squares problem that compensates for undesirable scaling artifacts in the intermediate result.

2-1-1. Shape-Preserving Manipulation

A point $p_i$ on a motion path may be represented with respect to neighboring points, as expressed by Equation 9.

$$p_i = p_{i-1} + x_i(p_{i+1} - p_{i-1}) + y_i R(p_{i+1} - p_{i-1}), \quad \text{[Equation 9]}$$

where $(x_i, y_i)$ denote the local coordinates of the point $p_i$. The first phase of the algorithm may intend to minimize the distortion in local coordinates while satisfying user constraints. In order to minimize the distortion, it is expected that Equation 9 may hold for a deformed path $\bar{p} = \{\bar{p}_i\}$ with the same local coordinates at every point. This condition may be formulated as a linear system $A^k \bar{p}^k = 0$ for each motion path k. The right hand side of Equation 9 may correspond to zero since a constant term is absent in Equation 9. Concatenating linear systems for multiple motion paths and user-defined soft constraints may form an over-determined linear system $M_s \bar{p} = m_s$, as expressed by Equation 10.

$$M_s \bar{p} = \underbrace{\begin{pmatrix} A^0 & 0 & \cdots & 0 \\ 0 & A^1 & \cdots & 0 \\ \vdots & \vdots & \ddots & \\ 0 & 0 & \cdots & A^k \end{pmatrix}}_{B_s} \bar{p} = \begin{pmatrix} 0 \\ 0 \\ \vdots \\ 0 \\ b_s \end{pmatrix} = m_s,$$ [Equation 10]

which may be subject to user-defined hard constraints $H_s \bar{p} = h_s$.

In this instance, using the pseudo-inverse of $M_s$ and Lagrange multipliers $\lambda_s$, the objective of shape-preserving manipulation may be a minimizing energy function, as expressed by Equation 11.

$$E_{shape} = \min_{\bar{p}} \left\| \frac{1}{2} \bar{p}^\top M_s^\top M_s \bar{p} - \bar{p}^\top M_s^\top m_s + (H_s \bar{p} - h_s)^\top \lambda_s \right\|$$ [Equation 11]

By differentiating with respect to $\bar{p}$, $\lambda_s$ may lead to the augmented system, as expressed by Equation 12.

$$\begin{pmatrix} M_s^\top M_s & H_s^\top \\ H_s & 0 \end{pmatrix} \begin{pmatrix} \bar{p} \\ \lambda_s \end{pmatrix} = \begin{pmatrix} M_s^\top m_s \\ h_s \end{pmatrix}$$ [Equation 12]

The result $\bar{p}$ at the first phase may be obtained by solving the unconstrained system expressed by Equation 12, which may be sparse and thus, may be solved efficiently using a sparse LU solver.

2-1-2. Scale Compensation

The second phase may adjust the intermediate result $\bar{p}$ to remove scaling artifacts. A vector between two successive points $\bar{p}_i$ and $\bar{p}_{i+1}$ scaled to the original lengths in the undeformed path may be expressed by Equation 13.

$$\bar{v}_i = (\bar{p}_{i+1} - \bar{p}_i) \frac{\|p_{i+1} - p_i\|}{\|\bar{p}_{i+1} - \bar{p}_i\|}$$ [Equation 13]

At the second phase, the scale-preserving path $\{\hat{p}_i\}$ may be bent or flattened to satisfy user constraints. Therefore, the scale-preservation objective may lead to a linear equation as expressed by Equation 14.

$$\hat{v}_i - \hat{v}_{i-1} = \bar{v}_i - \bar{v}_{i-1},$$ [Equation 14]

where $\hat{v}_i = \hat{p}_{i+1} - \hat{p}_i$. This objective may form a collection of linear systems $\hat{A}^k \hat{p}^k = \hat{a}^k$ for a path k. Concatenating the linear systems for multiple paths and the user-defined soft constraints may form an over-determined linear system $\hat{M}_s \hat{p} = \hat{m}_s$ subject to hard constraints. Replacing $M_s$ with $\hat{M}_s$ in Equations 11 and 12, the objective function $E_{scale}$ for scale compensation and a corresponding augmented system may be derived.

2-2. Handling Degenerate Cases

The motion editing system may deal with two types of degenerate cases.

The first type of degenerate case may correspond to a stationary path. Some human motion data may look natural after a large deformation while some others may be fragile even for a small deformation. For example, walking motions may usually be resilient to bending of moving paths and thus, may be deformed with a wide range of curvature angles. Conversely, manipulating the path of a stationary motion may make the character hover unnaturally, with slippery feet. A sub-path corresponding to a part of a motion path may be stationary if the average velocity on the path is within a threshold or both feet are firmly planted on the ground. The motion editing system may treat stationary sub-paths as rigid segments, in such a way that the sub-paths may be not deformed during interactive manipulation. That is, the foregoing may be performed simply by putting the corresponding shape-preserving constraints of Equation 9 into a collection of hard constraints.

The second type of degenerate case may correspond to tangent flipping.

Figure 2:
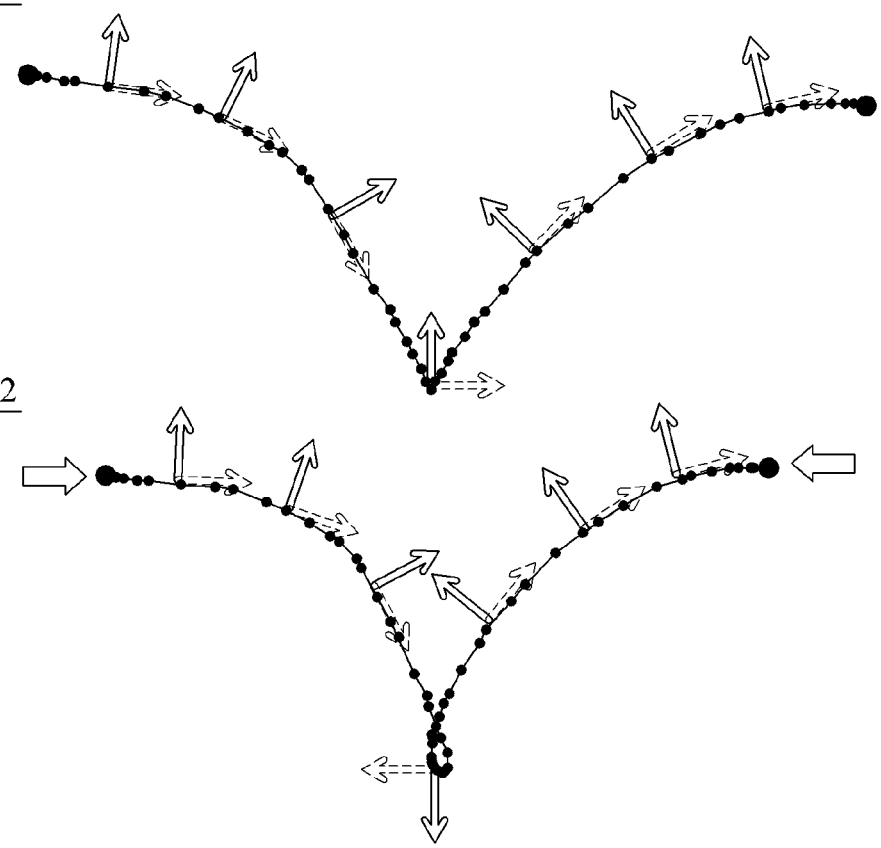
FIG. 2 illustrates tangent flipping according to an embodiment of the present invention.

FIG. 2 illustrates tangent flipping according to an embodiment of the present invention. Gentle squeezing of a motion path, for example, a first curve 201, may cause the tangent direction to flip at the middle of the motion path as shown in a second curve 202. That is, a small deformation of a motion path may cause a tangent direction to flip. In this instance, tangent flipping may be identified by checking angles between successive tangent vectors. That is, a sudden change of a tangent direction may indicate tangent flipping. More precisely, tangent vectors $t_i$ and $\hat{t}_i$ of undeformed and deformed paths may be considered. The angle $\phi_i = \angle(t_i, \hat{t}_i)$ between $t_i$ and $\hat{t}_i$ may provide a useful measure. The motion editing system may report tangent flipping if $\|\phi_{i+1} - \phi_i\|$ is beyond a user-provided threshold for a predetermined i. In this instance, a new tangent vector may be determined at the singular point by linearly interpolating nearby tangent vectors.

2-3. Full-Body Refinement

The full-body motion of the character along the deformed path may require a final touch-up to enforce user-defined end-effector constraints and avoid foot-sliding artifacts. The contact between the foot of the character and the ground may be identified automatically if the foot is sufficiently close to the ground and the velocity is below a threshold. The ground contact constraints and end-effector constraints may feed into a hybrid inverse kinematics solver and hierarchical displacement mapping to adapt full-body motions.

Although root path editing may be formulated as a very efficient linear formulation, end-effector constraints may involve non-linear equations and thus require an iterative inverse kinematics solver. The combination of root path editing and IK-based clean up may be a pragmatic solution that makes the motion editing system fast enough for practical applications. In order to make this combination work, end-effector constraints may usually be supplemented with root constraints. For example, to create a character carrying a box, the motion editing system may first constrain the box to stay near the root using a relative position and orientation constraint, and may then constrain the hands of the character to touch the box using end-effector constraints. The root-box constraints may keep the box moving, along with the character, while the character is moving, and the end-effect constraints may refine the pose of the character at every time frame to keep the hands touching the box. It may be a natural combination to use root constraints to specify the global location and orientation of the character and end-effector constraints to adjust the pose of the character in small scales.

2-4. Interactive Time Warping

The Laplacian curve manipulation method may be used for interactive time warping. In the motion editing system, arbitrary temporal constraints may be specified by the user. Then, the motion editing system may compute a one-dimensional smooth time-warping to meet user-defined constraints.

Figure 3:
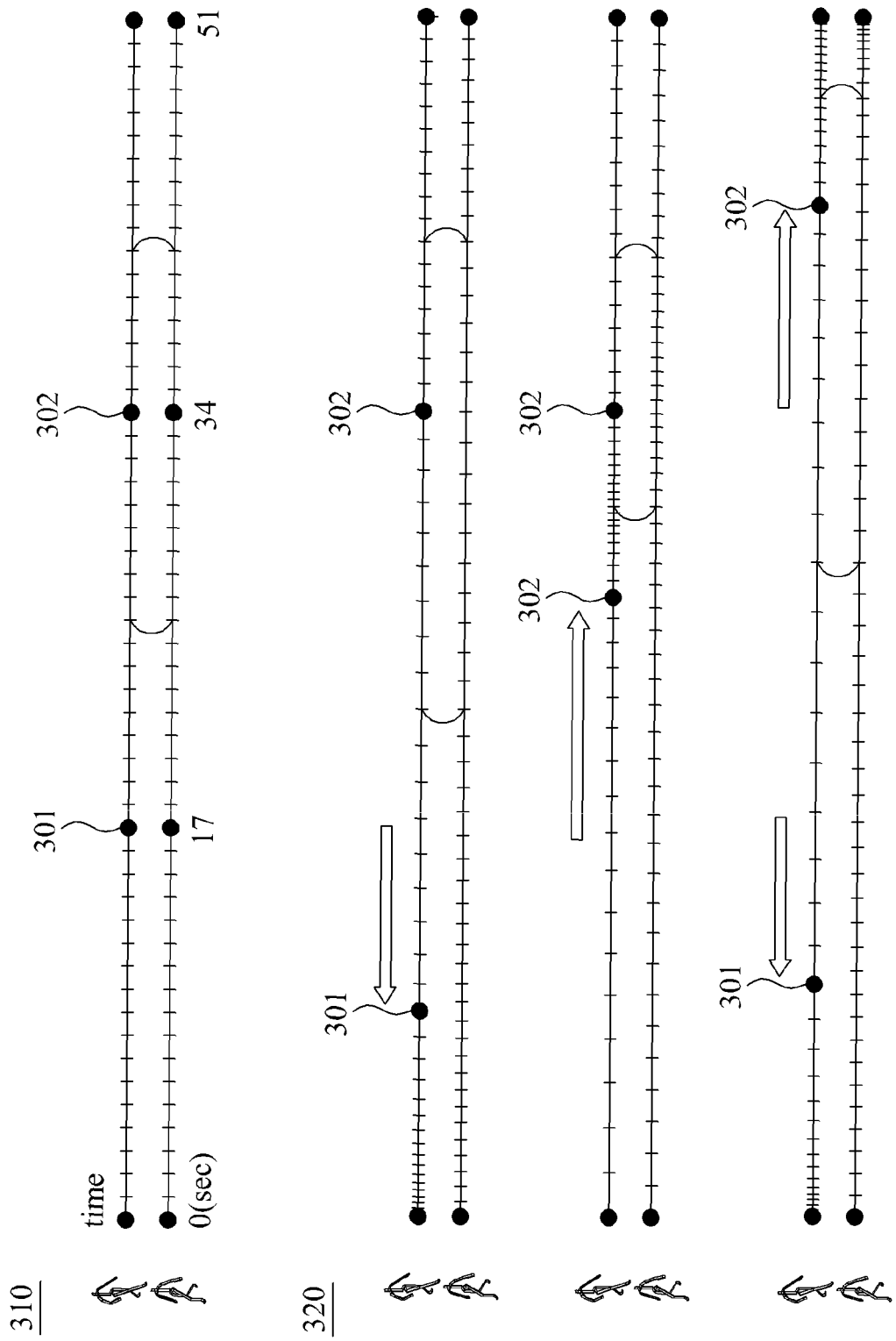
FIG. 3 illustrates processing of interactive time warping between two synchronized time tracks in a motion editing system according to an embodiment of the present invention.

FIG. 3 illustrates processing of interactive time warping between two synchronized time tracks in the motion editing system according to an embodiment of the present invention. An original uniform time track 310 may be interactively manipulated to generate smooth and synchronized time warping. That is, like a time track 320 where time warping occurs, the user may adjust absolute times 301 and 302 with respect to only a single time track, and another time track may be warped accordingly.

Input motion data may be uniformly sampled such that $t_{i+1}-t_i=h$, where h is the sampling time step. Time warping may be carried out while preserving as much uniformity as possible. This condition may be formulated as a linear system $T^k \hat{t}^k = h$ for each motion path k, where $\hat{t}_k = (t_i^k)$ denotes the time warping of the k-th motion path. Matrix $T^k$ may be banded and only two diagonals may have non-zero values. $h=(h \ldots h)^T$ may correspond to a constant vector. Concatenating linear systems for multiple motion paths and soft temporal constraints $B_t \bar{t} = b_t$ may form an over-determined linear system $M_t \bar{t} = m_t$, as expressed by Equation 15.

$$M_t \bar{t} = \underbrace{\begin{pmatrix} T^0 & 0 & \ldots & 0 \\ 0 & T^1 & \ldots & 0 \\ \vdots & \vdots & \ddots & \\ 0 & 0 & \ldots & T^k \\ \hline & & B_t & \end{pmatrix}}_{B_t} \bar{t} = \begin{pmatrix} h \\ h \\ \vdots \\ h \\ b_t \end{pmatrix} = m_t$$ [Equation 15]

which may be subject to hard temporal constraints $H_t \bar{t} = h_t$. Replacing $M_s$ with $M_t$ in Equations 11 and 12, the objective function $E_{time}$ for time warping and a corresponding augmented system may be derived, as expressed by Equation 16.

$$\begin{pmatrix} M_t^T M_t & H_t^T \\ H_t & 0 \end{pmatrix} \begin{pmatrix} \bar{t} \\ \lambda_t \end{pmatrix} = \begin{pmatrix} M_t^T m_t \\ h_t \end{pmatrix}$$ [Equation 16]

Time warping may require only the first phase of the path editing algorithm. The scaling artifact may occur usually in a direction orthogonal to a dragging direction of the manipulator. Therefore, scale compensation may not be required for one-dimensional curves. The second phase of the path editing algorithm may be rather harmful to motion data. That is, the path editing algorithm may cause the frames in the middle of motion data to scale more rapidly than the frames at the beginning and end of the data.

As time never goes backward, time-warping may be increased monotonically. Undue time warping may result in time flipping or an excessive slowdown of motion sequences. The motion editing system may address the foregoing problem by imposing inequality constraints $h_{min} < t_{i+1} - t_i < h_{max}$ for each i. Here, the linear system in Equation 16 may not easily incorporate inequality constraints. Instead, the motion editing system may impose the inequality constraints in an iterative manner. The motion dieting system may first solve the linear system without inequality constraints and may then insert equality constraints as expressed by Equation 17.

$(t_{i+1}-t_i=h_{min}$ if $t_{i+1}-t_i<h_{min}$ for any $i$, and $t_{i+1}-t_i=h_{max}$ if $t_{i+1}-t_i>h_{max})$, [Equation 17]

where the inequality constraints may be violated. Accordingly, the motion editing system may repeat the foregoing process until all inequality constraints are satisfied.

III. Discrete Motion Editing

According to an embodiment of the present invention, discrete motion editing in the motion editing system may allow discrete transforms to occur appropriately and seamlessly while manipulating a motion path.

FIG. 4 illustrates walking motions of a character according to an embodiment of the present invention. In FIG. 4, an input walking motion 401, a walking motion 402 with longer strides that may be necessarily entailed by Laplacian path editing, and a walking motion 403 through discrete motion editing introducing extra steps to deal with excessive stretching are shown. That is, without discrete transformations, stretching the input walking motion 401 using two pinning constraints only may result in unnaturally longer strides. The motion editing system may automatically introduce extra steps through a discrete optimization procedure to avoid making excessively long strides, that is, the walking motion 402.

In order to avoid re-synthesizing the entire path, path planning or state-space search techniques may be used during interactive manipulation. The user may usually want to have gradual changes on the motion of the character while dragging a mouse of the user. A totally new re-planned path suddenly suggested by a smart planner may be often confusing for the user. Instead, a user interface provided by the motion editing system may be intended to make small and predictable discrete changes at each moment so that discrete editing may be seamlessly incorporated into continuous path editing. Furthermore, an incremental update approach may be more efficient, computationally, than re-synthesizing the path from scratch.

Discrete path editing may allow such structural changes to happen seamlessly during Laplacian path editing. Hereinafter, methods of identifying potential discrete transformations, evaluating transformed paths, and incorporating discrete optimization into interactive motion editing interfaces while retaining the interactive performance will be described.

3-1. Discrete Transformations

Motion graphs of input motion data may be built to identify plausible structural changes to motion data efficiently. The nodes of a motion graph may correspond to motion frames and edges of the nodes may correspond to connecting transitions between frames. The motion graph may be automatically constructed from input motion data by identifying similar frames and creating transitions between similar frames. A similarity measure may be used to decide whether two motion frames are sufficiently similar. The measure may consider various features of motion, including joint angles, root height, root orientation, the velocities of joints, root translation, and root rotation. Motion frames may be temporally coherent and thus many connecting transitions may have nearby start and end frames. The motion editing system may favor the most likely transitions among many similar transitions by selecting local maxima in the transition matrix. All the other transitions may be pruned to produce a sparse set of connecting transitions.

Figure 5:
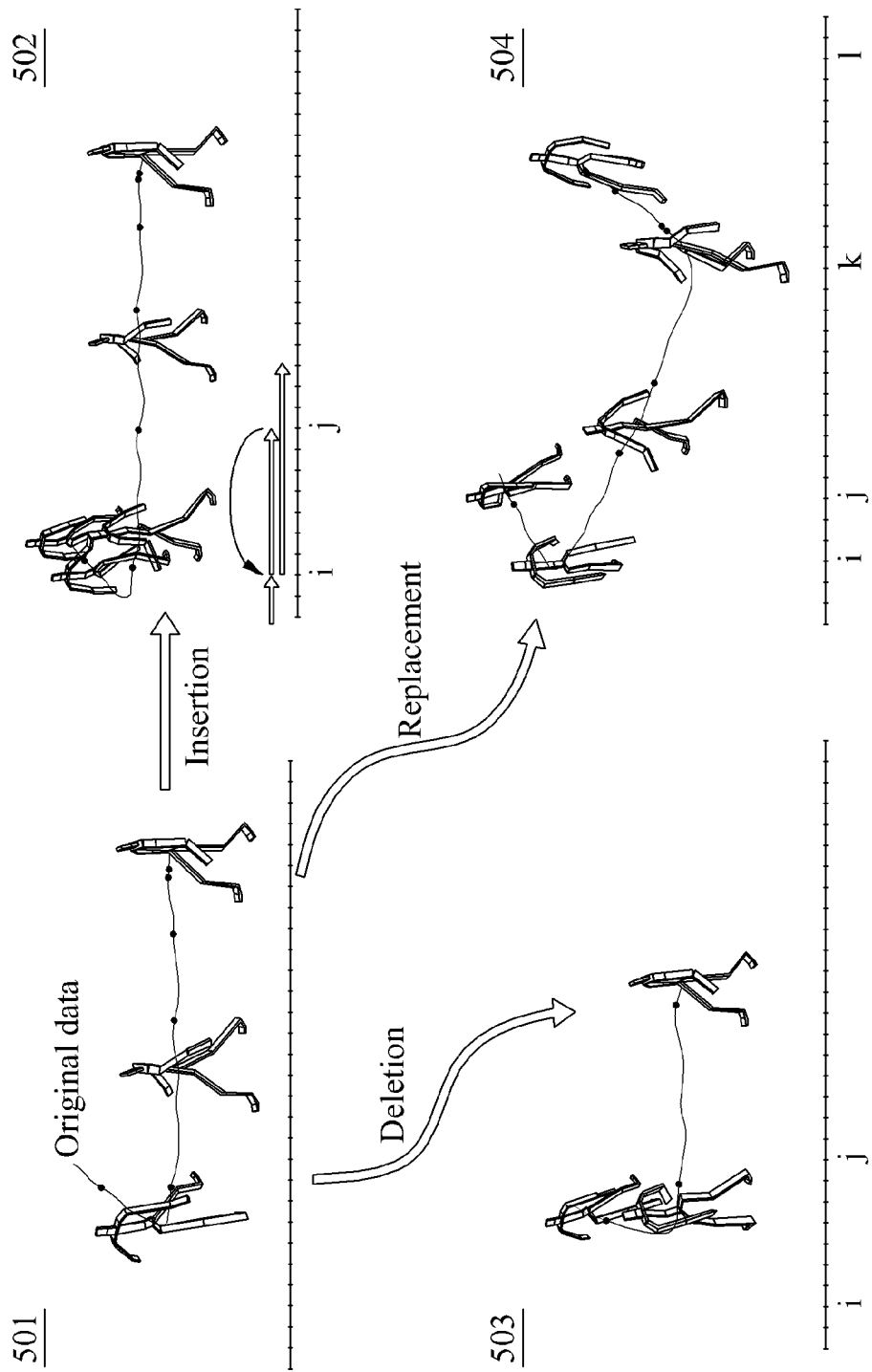
FIG. 5 illustrates three types of discrete transformations according to an embodiment of the present invention.

The motion editing system may use three types of discrete transformations, that is, insertion, deletion, and replacement. FIG. 5 illustrates the three types of discrete transformations according to an embodiment of the present invention. That is, in FIG. 5, each changed motion may be shown using data 502 to which the original data 501 is inserted, data 503 from which the original data 501 is deleted, and data 504 in which the original data 501 is replaced.

Let a frame i and a frame j be similar frames that allow connecting of transitions from one frame to the other frame, where i<j. Traversing the forward transition from i to j+1 may result in the deletion of frames between i+1 and j, while traversing the backward transition from j to i+1 may lead to duplicating frames between i+1 and j. Here, duplication may correspond to a special type of insertion. In general, insertion may require two transitions from i to j+1 and then from k to i+1, for j<k, which may lead to copying frames from j+1 to k and inserting the copied frames between frames from i and i+1. Similarly, replacement using two transitions from i to k+1 and then from 1 to j+1, for i<j and k<l, may lead to replacing frames between i+1 and j with frames between k+1 and l.

3-2. Discrete Optimization

The motion editing system may apply an appropriate discrete transformation, if needed, to a motion path in immediate response to user manipulation. In this instance, only one motion path may be transformed for each update of user constraints. FIG. 6 illustrates an algorithm to be used to optimize a discrete transformation in a motion editing system according to an embodiment of the present invention. According to the algorithm of FIG. 6, once either user spatial constraints or user temporal constraints are updated, the motion editing system may calculate all possible discrete transformations, and may evaluate each transformation with respect to user constraints. Then, the best transformation may be selected and deformed to meet user constraints precisely, using Laplacian motion editing techniques. The algorithm of FIG. 6 may be appropriate for interactive manipulation since responses to each update of user constraints may be immediate and predictable.

3-2-1. Deformation Energy

Herein, how well each transformed path fits user-defined constraints may be determined. When Laplacian motion editing for both path and time-warping on the transformed path is performed to meet user constraints, an amount of deformation energy may be calculated as expressed by Equation 18.

$$E = E_{shape} + E_{scale} + E_{time} + c_s |L_s(P') - L_s(P)| + c_t |c_t| L_t(P') - L_t(P)|, \quad \text{[Equation 18]}$$

where P denotes the original motion path and P' denotes a transformed, deformed, and time-warped path. $E_{shape}$, $E_{shape}$ and $E_{time}$ denote the amounts of deformation energy for shape-preservation, scale-compensation and time-warping, respectively. $L_s$ denotes a spatial path length and $L_t$ denotes temporal duration. The first three terms may penalize path deformation by Laplacian motion editing and the last two terms may penalize lengthening and shortening of motion paths by discrete transformation. $c_s$ and $c_t$ may weigh the path deformation against discrete transformation.

3-2-2. Pruning Discrete Transformations

A considerably large number of potential discrete transformations to enumerate and evaluate, comprehensively, at interactive rates may often occur. Accordingly, it may be important to prune as many unsuitable discrete transformations as possible before applying Laplacian motion editing. The interactivity of motion editing and user constraints for pruning the unsuitable discrete transformations will be described.

Duration: A corresponding discrete transformation may be pruned if the interval of motion frames to be deleted or inserted by the discrete transformation is either too short or too long. Discrete transformations of very short interval may tend to occur too frequently while discrete transformations of very long interval may cause abrupt visual changes in motion manipulation. For example, transformations of 0.3 to 2.0 seconds may be accepted.

Enclosing: One discrete transformation may enclose the other discrete transformation if the interval of motion frames to be deleted or inserted by the former transformation includes the interval of motion frames to be affected by the latter transformation. The former discrete transformation may be pruned if the former discrete transformation encloses another transformation. The rationale for the pruning rule may come from the interactivity of manipulation. It may be assumed that user constraints may be updated continuously as the user drags a manipulator. Therefore, the enclosed discrete transformation will be invoked, if needed, and the enclosing transformation may never occur.

Constraints: A discrete transformation may not remove any user-defined constraints. Specifically, discrete transformations that delete or replace a predetermined frame curbed by instant constraints may be pruned. Motion frames curbed by variational constraints may be deleted, replaced with other frames, and may allow other frames to be inserted by discrete transformations as long as the boundary frames where variational constraints initiate and terminate remain intact.

Locality: Discrete transformations may occur unexpectedly far away from the point or time the user may manipulate. The motion editing system may provide the user with simple user interfaces to enable and disable discrete transformations. Accordingly, the user may selectively enable specific transformation types, characters, time zones, spatial regions that permit discrete transformations.

3-2-3. Acceleration Technique

A performance bottleneck of discrete path editing using discrete transformations may correspond to the evaluation of potential discrete transformations. The evaluation of each discrete transformation may demand solving three large and sparse linear systems for continuous Laplacian motion editing. The size of linear systems may depend on a total number of frames in motion paths. The motion editing system may trade off the accuracy of evaluation for further performance gain. That is, the motion editing system may subsample motion paths to construct smaller linear systems. When subsampling the motion path, user-defined constraints and potential discrete transformations may need to be retained. The requirement may lead to non-uniform subsampling of motion frames. Laplacian motion editing with subsampled paths may give quite a reasonable approximation of the deformation energy of the original, full-frame paths. Evaluating the deformation energy may not require end-effector constraints to be satisfied. Hierarchical displacement mapping may be applied once, at the end of the algorithm.

Figure 7:
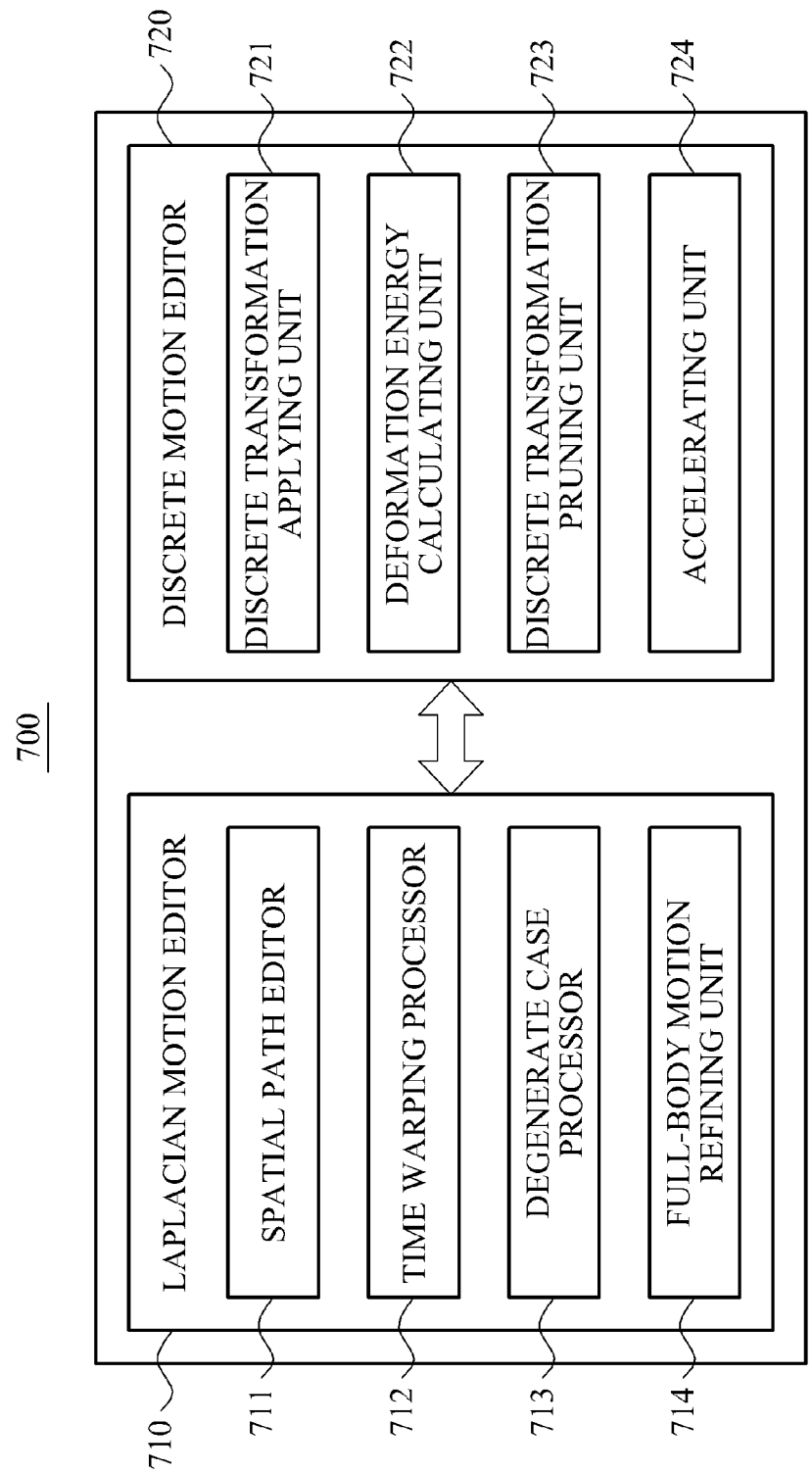
FIG. 7 illustrates an internal configuration of a motion editing system according to an embodiment of the present invention.

FIG. 7 illustrates an internal configuration of a motion editing system 700 according to an embodiment of the present invention. The motion editing system 700 may include a Laplacian motion editor 710 and a discrete motion editor 720, as illustrated in FIG. 7.

The Laplacian motion editor 710 may edit a spatial path of character data input according to user constraints, and may process interactive time warping. Here, the user constraints may include spatial constraints including pinning constraints, relative constraints, and end-effector constraints, and temporal constraints including an absolute time, duration, and synchronization.

In order to process spatial path editing and interactive time warping, the Laplacian motion editor 710 may include a spatial path editor 711, a time warping processor 712, a degenerate case processor 713, and a full-body motion refining unit 714, as illustrated in FIG. 7.

The spatial path editor 711 may edit the spatial path through shape-preserving manipulation and scale compensation. In this instance, the spatial path editor 711 may obtain intermediate results by extending an over-determined linear system for the shape-preserving manipulation using a pseudo-inverse and Lagrange multipliers. Here, the over-determined linear system may be maintained so that a deformed path with identical local coordinates at every point may be identical to a set of deformed local coordinates, and may be formed to be concatenated with soft constraints among the user constraints.

The spatial path editor 711 may adjust the intermediate results according to the shape-preserving manipulation by removing scaling artifacts through the scale compensation. In this instance, the scaling artifacts may be removed through a system obtained by extending the over-determined linear system using the pseudo-inverse and the Lagrange multipliers, and the over-determined linear system may be formed through concatenation of soft constraints among the user constraints and a linear system for multiple paths.

The time warping processor 712 may process the interactive time warping. In this instance, the time warping processor 712 may process the time warping through a system obtained by extending the over-determined linear system using the pseudo-inverse and Lagrange multipliers. Here, the over-determined linear system may be formed through concatenation between soft constraints among the user constraints and a linear system formulated by uniformly sampling input motion data.

The degenerate case processor 713 may process degenerate cases. In this instance, the degenerate cases may include a stationary path or tangent flipping. The degenerate case processor 713 may process the stationary path by putting constraints regarding the shape-preserving manipulation, among the user constraints, into a collection of hard constraints, or may processes the tangent flipping by identifying tangent flipping that is beyond a user-provided threshold, and linearly interpolating nearby tangent vectors at a singular point.

The full-body motion refining unit 714 may refine a full-body motion of a character. In this instance, the full-body motion refining unit 714 may refine the full-body motion of the character using a hybrid inverse kinematics solver and hierarchical displacement mapping, end-effector constraints, and constraints according to contact occurring between a foot of the character and the ground, among the user constraints.

The discrete motion editor 720 may apply discrete transformations while the character data is processed. Here, types of discrete transformation may correspond to insertion, deletion, and replacement.

In order to apply the discrete transformations, the discrete motion editor 720 may include a discrete transformation applying unit 721, a deformation energy calculating unit 722, a discrete transformation pruning unit 723, and an accelerating unit 724, as illustrated in FIG. 7.

The discrete transformation applying unit 721 may apply a discrete transformation to a motion path of the character data. In this instance, the discrete transformation applying unit 721 may calculate all possible discrete transformations, evaluate each discrete transformation with respect to the user constraints, select, based on a result of the evaluation, a discrete transformation to be applied, and apply the selected discrete transformation to the motion path.

The deformation energy calculating unit 722 may calculate an amount of deformation energy of the motion path, which the discrete transformation is applied to, satisfying the user constraints. In this instance, the deformation energy calculating unit 722 may calculate the amount of the deformation energy satisfying the constraints, based on a weight applied to path deformation against deformation energy of shape-preservation, scale-compensation, and time-warping, respectively, a spatial path length, a temporal duration, and discrete transformations.

The discrete transformation pruning unit 723 may prune unsuitable discrete transformations. In this instance, the discrete transformation pruning unit 723 (1) may prune a corresponding unsuitable discrete transformation when an interval of a motion frame to be deleted or inserted by the discrete transformation is out of a predetermined range, (2) may prune a second unsuitable discrete transformation when an interval of a motion frame to be deleted or inserted by a first discrete transformation includes an interval of a motion frame affected by the unsuitable second discrete transformation, and when the second unsuitable discrete transformation includes the first discrete transformation, (3) may prune an unsuitable discrete transformation that deletes or replaces any motion frame curbed by instant constraints, or (4) may provide a user interface to enable and disable discrete transformations, and receive, from a user, information according to the enabling and disabling and information about discrete transformation types, characters, time zones, and spatial regions that permit discrete changes, through the user interface.

The accelerating unit 724 may subsample motion paths for evaluating the discrete transformation.

Figure 8:
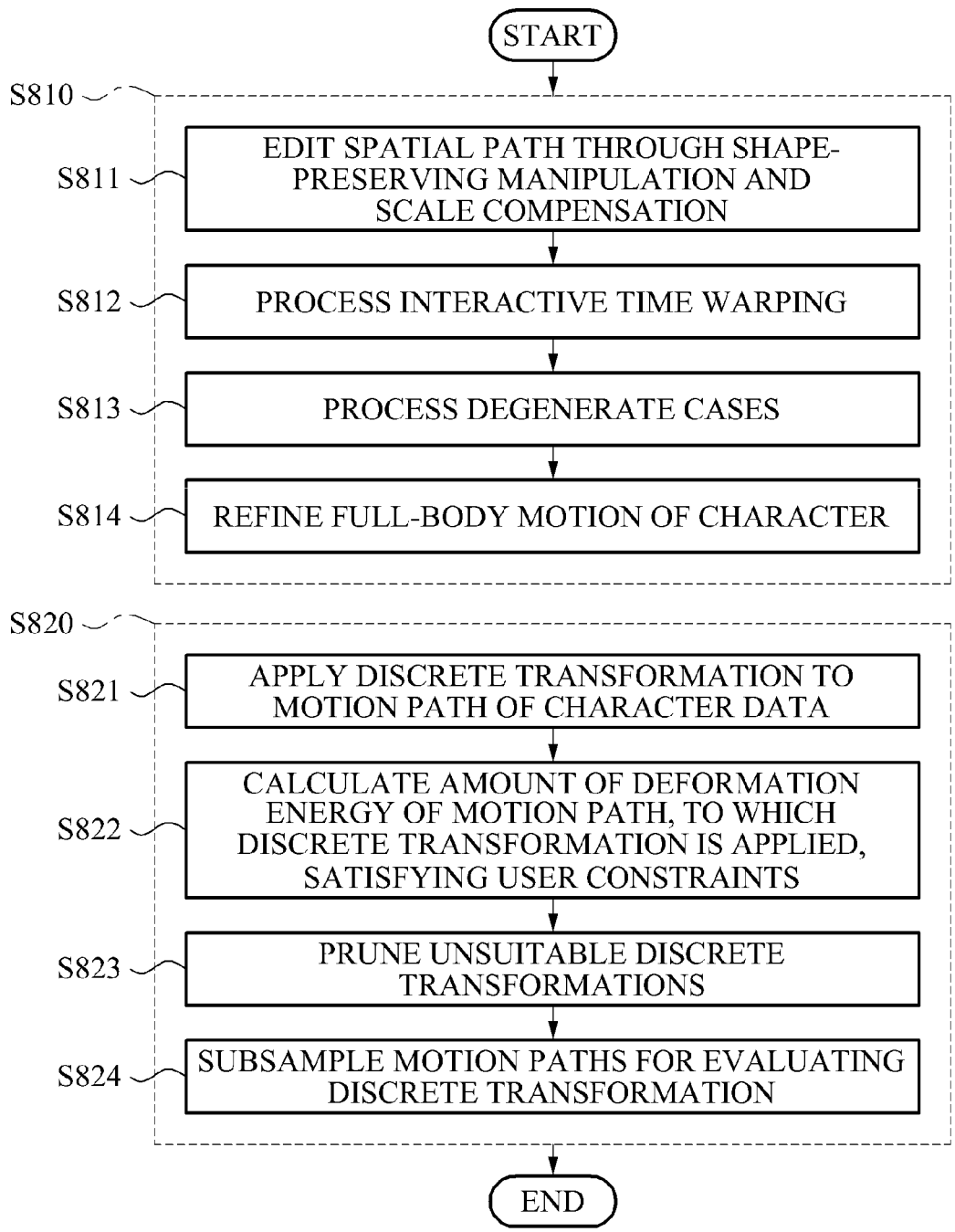
FIG. 8 illustrates a motion editing method according to an embodiment of the present invention.

FIG. 8 illustrates a motion editing method according to an embodiment of the present invention. The motion editing method may be performed by the motion editing system 700 described with reference to FIG. 7. The motion editing method will be described by describing a process of performing each operation through the motion editing system.

In operation S810, the motion editing system 700 may edit a spatial path of character data input according to user constraints, and may process interactive time warping. Here, the user constraints may include spatial constraints including pinning constraints, relative constraints, and end-effector constraints, and temporal constraints including an absolute time, duration, and synchronization.

In order to process spatial path editing and interactive time warping, the motion editing system 700 may perform an operation S810 including operations S811 through S814, as illustrated in FIG. 8.

In operation S811, the motion editing system 700 may edit the spatial path through shape-preserving manipulation and scale compensation. In this instance, the motion editing system 700 may obtain intermediate results by extending an over-determined linear system for the shape-preserving manipulation using a pseudo-inverse and Lagrange multipliers. Here, the over-determined linear system may be maintained so that a deformed path with identical local coordinates at every point may be identical to a set of deformed local coordinates, and may be formed to be concatenated with soft constraints among the user constraints.

Also, the motion editing system 700 may adjust the intermediate results according to the shape-preserving manipulation by removing scaling artifacts through the scale compensation. In this instance, the scaling artifacts may be removed through a system obtained by extending the over-determined linear system using the pseudo-inverse and the Lagrange multipliers, and the over-determined linear system may be formed through concatenation of soft constraints among the user constraints and a linear system for multiple paths.

In operation S812, the motion editing system 700 may process the interactive time warping. In this instance, the motion editing system 700 may process the time warping through a system obtained by extending the over-determined linear system using the pseudo-inverse and Lagrange multipliers. Here, the over-determined linear system may be formed through concatenation between soft constraints among the user constraints and a linear system formulated by uniformly sampling input motion data.

In operation S813, the motion editing system 700 may process degenerate cases. In this instance, the degenerate cases may include a stationary path or tangent flipping. The motion editing system 700 may process the stationary path by putting constrains regarding the shape-preserving manipulation, among the user constraints, into a collection of hard constraints, or may processes the tangent flipping by identifying tangent flipping that is beyond a user-provided threshold, and linearly interpolating nearby tangent vectors at a singular point.

In operation S814, the motion editing system 700 may refine a full-body motion of a character. In this instance, the motion editing system 700 may refine the full-body motion of the character using a hybrid inverse kinematics solver and hierarchical displacement mapping, end-effector constraints, and constraints according to contact occurring between a foot of the character and the ground, among the user constraints.

In operation S820, the motion editing system 700 may apply discrete transformations while the character data is processed. Here, types of discrete transformation may correspond to insertion, deletion, and replacement.

In order to apply the discrete transformations, the motion editing system 700 may perform an operation S820 including operations S821 through S824, as illustrated in FIG. 8.

In operation S821, the motion editing system 700 may apply a discrete transformation to a motion path of the character data. In this instance, the motion editing system 700 may calculate all possible discrete transformations, evaluate each discrete transformation with respect to the user constraints, select, based on a result of the evaluation, a discrete transformation to be applied, and apply the selected discrete transformation to the motion path.

In operation S822, the motion editing system 700 may calculate an amount of deformation energy of the motion path, which the discrete transformation is applied to, satisfying the user constraints. In this instance, the motion editing system 700 may calculate the amount of the deformation energy satisfying the constraints, based on a weight applied to path deformation against deformation energy of shape-preservation, scale-compensation, and time-warping, respectively, a spatial path length, a temporal duration, and discrete transformations.

In operation S823, the motion editing system 700 may prune unsuitable discrete transformations. In this instance, the motion editing system 700 (1) may prune a corresponding unsuitable discrete transformation when an interval of a motion frame to be deleted or inserted by the discrete transformation is out of a predetermined range, (2) may prune a second unsuitable discrete transformation when an interval of a motion frame to be deleted or inserted by a first discrete transformation includes an interval of a motion frame affected by the unsuitable second discrete transformation, and when the second unsuitable discrete transformation includes the first discrete transformation, (3) may prune an unsuitable discrete transformation that deletes or replaces any motion frame curbed by instant constraints, or (4) may provide a user interface to enable and disable discrete transformations, and receive, from a user, information according to the enabling and disabling and information about discrete transformation types, characters, time zones, and spatial regions that permit discrete changes, through the user interface.

In operation S824, the motion editing system 700 may subsample motion paths for evaluating the discrete transformation.

The above-described embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A computer program product for motion editing residing on a non-transitory computer readable medium having a plurality of instructions stored thereon executable by a computer, comprising:
   a Laplacian motion editor to edit a spatial path of character data input according to user constraints, and to process interactive time warping; and
   a discrete motion editor to apply discrete transformations to insert, delete, or replace motions of a character according to the character data on motion paths of the character data, wherein the discrete motion editor comprises:
      a discrete transformation applying unit to apply a discrete transformation to a motion path of the character data;
      a deformation energy calculating unit to calculate an amount of deformation energy of the motion path, which the discrete transformation is applied to, satisfying the user constraints;
      a discrete transformation pruning unit to prune unsuitable discrete transformations; and
      an accelerating unit to subsample motion paths for evaluating the discrete transformation;
   wherein the deformation energy calculating unit calculates the amount of the deformation energy satisfying the constraints, based on a weight applied to path deformation against deformation energy of shape-preservation, scale-compensation, and time-warping, respectively, a spatial path length, duration, and discrete transformations.

2. The computer program product of claim 1, wherein the Laplacian motion editor comprises:
   a spatial path editor to edit the spatial path through shape-preserving manipulation and scale compensation; and
   a time warping processor to process the interactive time warping.

3. The computer program product of claim 2, wherein the spatial path editor changes the motions in accordance with the user constraints while preserving shapes of multiple character motions, and determines multiple motions using a linear system satisfying both soft constraints and hard constraints among the user constraints.

4. The computer program product of claim 3, wherein the linear system is maintained so that a deformed path with identical local coordinates at every point of a global reference coordinate system may be identical to a set of deformed local coordinates, and is formed to be concatenated with soft constraints among the user constraints.

5. The computer program product of claim 2, wherein
the spatial path editor adjusts intermediate results according to the shape-preserving manipulation by removing scaling artifacts through the scale compensation, and
the scaling artifacts are removed by changing the motions in accordance with the user constraints while preserving shapes of the multiple character motions.

6. The computer program product of claim 2, wherein
the time warping processor processes the time warping by changing the motions in accordance with the user constraints while preserving time with respect to the multiple character motions.

7. The computer program product of claim 2, wherein the Laplacian motion editor further comprises:
a degenerate case processor to process degenerate cases; and
a full-body motion refining unit to refine a full-body motion of a character.

8. The computer program product of claim 7, wherein
the degenerate cases include a stationary path, and
the degenerate case processor processes the stationary path by putting constrains regarding the shape-preserving manipulation, among the user constraints, into a collection of hard constraints.

9. The computer program product of claim 7, wherein
the degenerate cases include tangent flipping, and
the degenerate case processor processes the tangent flipping by identifying tangent flipping that is beyond a user-provided threshold, and linearly interpolating nearby tangent vectors at a singular point of a global reference coordinate system.

10. The computer program product of claim 7, wherein the full-body motion refining unit refines the full-body motion of the character using a hybrid inverse kinematics solver and hierarchical displacement mapping, end-effector constraints, and constraints according to contact occurring between a foot of the character and the ground, among the user constraints.

11. The computer program product of claim 1, wherein the discrete transformation applying unit calculates all possible discrete transformations, evaluates each discrete transformation with respect to the user constraints, selects, based on a result of the evaluation, a discrete transformation to be applied, and applies the selected discrete transformation to the motion path.

12. The computer program product of claim 1, wherein the discrete transformation pruning unit prunes a corresponding unsuitable discrete transformation when an interval of a motion frame to be deleted or inserted by the discrete transformation is out of a predetermined range.

13. The computer program product of claim 1, wherein the discrete transformation pruning unit prunes a second unsuitable discrete transformation when an interval of a motion frame to be deleted or inserted by a first discrete transformation includes an interval of a motion frame affected by the unsuitable second discrete transformation, and when the second unsuitable discrete transformation includes the first discrete transformation.

14. The computer program product of claim 1, wherein the discrete transformation pruning unit prunes an unsuitable discrete transformation that deletes or replaces motion frame to which user-defined instant constraints are applied.

15. The computer program product of claim 1, wherein the discrete transformation pruning unit provides a user interface to enable and disable discrete transformations, and receives, from a user, information according to the enabling and disabling and information about discrete transformation types, characters, time zones, and spatial regions that permit discrete changes, through the user interface.

16. The computer program product of claim 1, wherein
types of discrete transformation correspond to insertion, deletion, and replacement, and
the user constraints include spatial constraints including pinning constraints, relative constraints, and end-effector constraints, and temporal constraints including an absolute time, duration, and synchronization.

* * * * *